United States Patent [19]

Butler et al.

[11] Patent Number: 5,694,402
[45] Date of Patent: Dec. 2, 1997

[54] SYSTEM AND METHOD FOR STRUCTURALLY TESTING INTEGRATED CIRCUIT DEVICES

[75] Inventors: Kenneth M. Butler, Plano; Theo J. Powell, Dallas, both of Tex.

[73] Assignee: Texas Instruments Incorporated, Dallas, Tex.

[21] Appl. No.: 735,294

[22] Filed: Oct. 22, 1996

[51] Int. Cl.⁶ .................................................. G06F 11/00
[52] U.S. Cl. .................................. 371/22.4; 395/183.06
[58] Field of Search ........................ 371/22.4, 22.1, 371/22.2, 22.3, 22.5, 22.6, 27; 395/183.06

[56] References Cited

U.S. PATENT DOCUMENTS 5,383,143  1/1995  Crouch et al. ....................... 364/717
5,574,733  11/1996  Kim ....................................... 371/27
5,617,531  4/1997  Grouch et al. .................. 395/183.01

*Primary Examiner*—Vincent P. Canney
*Attorney, Agent, or Firm*—W. James Brady, III

[57] ABSTRACT

A system (13) is provided for structurally testing an integrated circuit device. The system includes a signature analyzer (14) operable to compress test results received from the integrated circuit device into a signature. A control device (20) is coupled to the signature analyzer (14). The control device (20) is operable to enable the compression operation of the signature analyzer (14) when the test results contain known states and disable the compression operation when the test results contain unknown states.

20 Claims, 3 Drawing Sheets

SYSTEM AND METHOD FOR STRUCTURALLY TESTING INTEGRATED CIRCUIT DEVICES

TECHNICAL FIELD OF THE INVENTION

This invention relates in general to integrated circuits, and more particularly to a system and method for structurally testing semiconductor integrated circuit (IC) devices.

BACKGROUND OF THE INVENTION

As integrated circuit (IC) devices become more complex, structural testing for the devices becomes more difficult. Accordingly, specific methodologies have been established to facilitate the testing of a complex IC device. Under these methodologies, pseudo random and/or deterministic test patterns are used to exercise and monitor the structure of the IC device's internal logic. More particularly, calculations are performed in advance to determine what response should be output by the device for any particular test pattern. A test pattern is then input into the IC device, which in turn outputs actual test results. By comparing the actual test results with the calculated response, a testing system can determine whether the device is free of structural defects. However, full structural testing under these methodologies requires that the testing system manipulate and store thousands of test patterns and the corresponding calculated responses. Consequently, these methodologies require massive pattern memories and complex pattern sequence circuitry, both of which contribute significantly to the cost and size of the testing system.

In order to reduce the amount of memory and circuitry required for full structural testing, some previously developed systems and methods for testing IC devices used a signature analyzer (SA) to implement a polynomial function upon a plurality of actual test results. The implementation of the polynomial function "compressed" the test results into a single, smaller pattern or "signature." For example, the test results may include a number of 24-bit sequences of data, which could be compressed into a single, 12-bit signature. This signature could then be analyzed to determine whether an IC device was free of structural defects. These previous systems and methods using signature analysis, however, required that each bit in the test results be a binary value of either "1" or "0." In other words, no "unknown states" could appear in any test results. Unknown states are states that a simulator or automatic test pattern generation (ATPG) program is unable to predict. Consequently, the application of these previous systems and methods using signature analysis was limited.

Accordingly, a need has arisen for a system and method for structurally testing an IC device that utilizes signature analysis to selectively compress test results output by the IC device to test the IC device where unknown states may appear in some test results.

SUMMARY OF THE INVENTION

In accordance with the teachings of the present invention, the disadvantages and problems associated with previously developed systems and methods for testing an IC device have been substantially reduced or eliminated.

According to an embodiment of the present invention, a system is provided for structurally testing an integrated circuit device. The system includes a signature analyzer operable to compress test results received from the integrated circuit device into a signature. A control device is coupled to the signature analyzer. The control device is operable to enable the compression operation of the signature analyzer when the test results contain known states and disable the compression operation when the test results contain unknown states.

According to another embodiment of the present invention, a system is provided for structurally testing an integrated circuit device. The system includes a signature analyzer operable to compress test results received from the integrated circuit device into a signature. A select device is coupled to the signature analyzer. The select device is operable to select a bit having a known state to be entered into the signature analyzer in place of each bit in the test results having an unknown state.

According to yet another embodiment of the present invention, a method for structurally testing an integrated circuit device is provided. The method includes a plurality of steps. These steps are: generating testing data to be used in testing the device, the testing data comprising a sequence of test patterns and corresponding test results having a plurality of bits; determining which test results contain any unknown states; inputting a test pattern into the integrated circuit device to generate test results; determining whether the test results contain any unknown states; if the test results do not contain unknown states, compressing the test results into a signature and analyzing the signature to determine if the integrated circuit device is functioning properly; and if the test results do contain unknown states, analyzing the test results to determine if the integrated circuit device is functioning properly.

An important technical advantage of the present invention is that a system may be enabled to compress test results which do not have any unknown states, and disabled if the test results do have unknown states.

A second important technical advantage of the present invention is that a system can be implemented either on an IC device to be tested or on a separate testing device.

A third important technical advantage of the present invention is that a system can be disabled so that there is no impact to the normal operation of an IC device.

A fourth important technical advantage of the present invention is that a system can be manually or automatically enabled and disabled.

A fifth important technical advantage of the present invention is that no additional shift register latches (SRLs) need to be added to a standard scan chain in order to form a signature analyzer in accordance with the present invention.

A sixth important technical advantage of the present invention is that testing may be performed "on the fly." Because data is scanned in and scanned out simultaneously, scan time is not increased.

A seventh important technical advantage is that a signature analyzer in accordance with the present invention may be used in conjunction with existing automatic test pattern generation (ATPG) programs and testing systems.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

The present invention provides a system and method for structurally testing IC devices. The system and method operate upon the test results data generated by an IC device in response to pseudo random test patterns input to the device. The present invention is able to selectively compress test results for many test patterns, thereby allowing the system and method to be used with an IC device in which unknown states may appear in some test results.

In many IC devices, data is input into and processed by a processing module. The processing module outputs other data in response to the input data. For example, a test pattern may be input into a processing module in order to generate test results. Both the data that is processed and the data that is output may be examined if a scan chain is implemented on the IC device. The scan chain itself does not operate upon data, but rather provides a means to view data contained in the circuits of the processing module.

Figure 1:
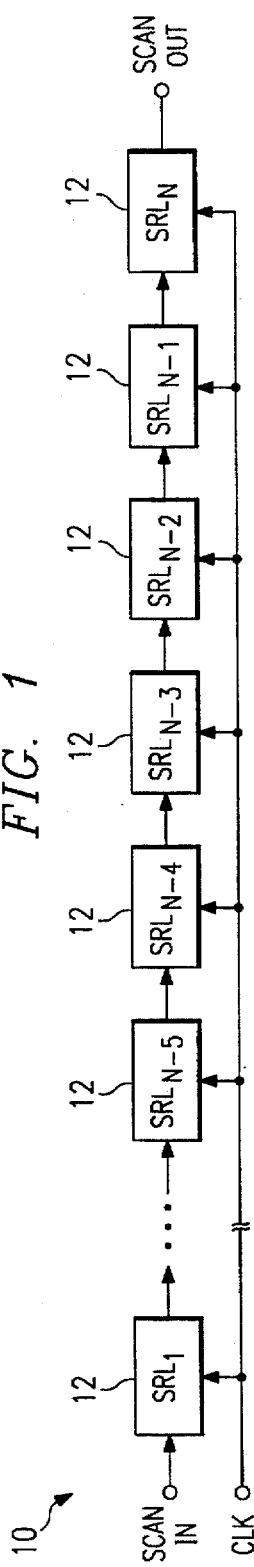
FIG. 1 is a block diagram depicting a normal scan chain formed from a plurality of shift register latches.

FIG. 1 is a schematic block diagram of a scan chain 10 that may be used to view test results contained in a processing module of an IC device. Scan chain 10 may be implemented on the IC device itself. Scan chain 10 is formed from a plurality of shift register latches (SRLs) 12. An SRL is a latch that has been modified so that its contents can be scanned. Accordingly, result data maybe read or examined as it moves through scan chain 10. Scan chain 10 includes N number of SRLs, which are correspondingly labeled $SRL_1, \ldots, SRL_{n-5}, SRL_{N-4}, SRL_{N-3}, SRL_{N-2}, SRL_{N-1}$, and $SRL_N$. N is considered to be the "length" of scan chain 10. A clock signal, applied at "CLK," is connected to the clock input of each SRL 12 in scan chain 10. Each of the SRLs 12 making up scan chain 10 is substantially similar. Furthermore, these SRLs 12 are sequentially connected. In other words, the output of one SRL 12 is used as the input for the subsequent SRL 12. For example, the output of $SRL_{N-3}$ is connected to the input of $SRL_{N-2}$. Test pattern results, and other data, are input into scan chain 10 at "SCAN IN" and are output at "SCAN OUT." More specifically, a data signal is applied to the input of $SRL_1$, and is output at the output of $SRL_N$. Data signals output by scan chain 10 may be input into a tester in order to test the function of the IC device.

In operation, a first data signal at SCAN IN is input into $SRL_1$ by applying a clock signal at CLK. Additional clock signals advance the first data signal from $SRL_1$ through the other SRLs 12 in scan chain 10. The additional clock signals also cause other data signals to be similarly input and advanced in scan chain 10. In other words, the first data signal is sequentially moved from one SRL 12 into a subsequent SRL 12 each time a clock signal is applied at CLK. Simultaneously, other data signals appearing at SCAN IN are moved through each SRL 12 of scan chain 10 following the first data signal. After N clock signals have been applied to scan chain 10, the first data signal is output by $SRL_n$ at SCAN OUT.

According to the present invention, a testing system can be structured from a portion of the SRLs of a scan chain. Because no additional SRLs are needed to form the system, the system does not require a large amount of additional circuitry or space. The system is used to implement a polynomial function upon the test results shifted through the scan chain, thereby compressing the test results into a single signature.

Figure 2:
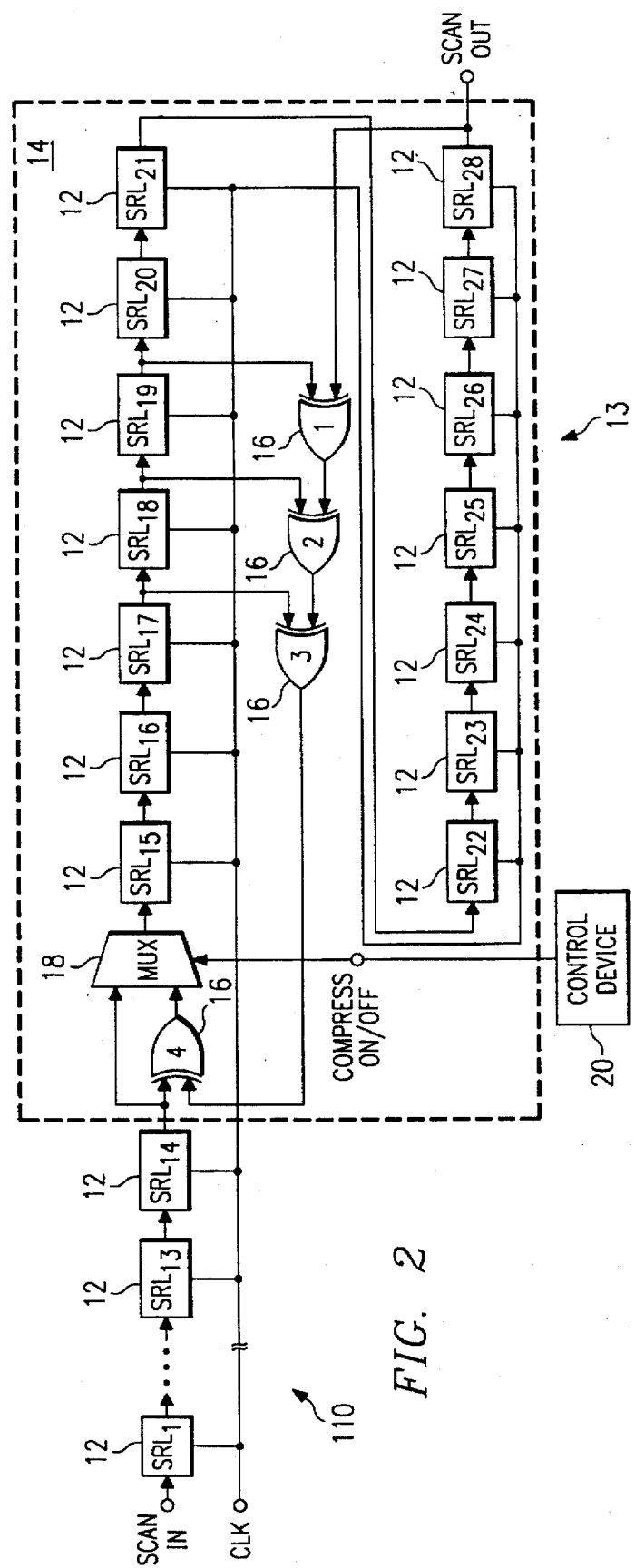
FIG. 2 is a block diagram depicting a system for structurally testing an IC device according to a first embodiment of the present invention.

FIG. 2 illustrates a system 13 for structurally testing an IC device in accordance with a first embodiment of the present invention. System 13 includes a signature analyzer (SA) 14, which may be formed using a number of the SRLs 12 contained in a scan chain 110, and a control device 20.

SA 14 includes a plurality of SRLs 12, a plurality of exclusive OR (XOR) gates 16, and a multiplexer (MUX) 18. Although scan chain 110 contains 28 SRLS 12, preferably only half of these SRLs are used to form SA 14. Thus, SA 14 is structured from fourteen SRLs 12. These SRLs 12 are labeled as $SRL_{15}$, $SRL_{16}$, $SRL_{17}$, $SRL_{18}$, $SRL_{19}$, $SRL_{20}$, $SRL_{21}$, $SRL_{22}$, $SRL_{23}$, $SRL_{24}$, $SRL_{25}$, $SRL_{26}$, $SRL_{27}$, and $SRL_{28}$. In addition, these SRLs 12 are located nearest the SCAN OUT point of scan chain 110. Furthermore, it is understood that scan chain 110 and SA 14 can be structured from more or less SRLs 12. In each embodiment, the number of SRLs 12 used to form SA 14 is a small portion of the total number of SRLs 12 contained in the scan chain 110, typically 24 or less.

The XOR gates 16 are labeled as $XOR_1$, $XOR_2$, $XOR_3$, and $XOR_4$. XOR gates 16 are used to "feed back" data in SA 14. Accordingly, XOR gates 16 are connected to the outputs of some of the SRLs 12 forming SA 14. Referring to FIG. 2, the outputs of $SRL_{28}$ and $SRL_{19}$ are connected to the inputs of $XOR_1$. The outputs of $SRL_{18}$ and $XOR_1$ are connected to the inputs of $XOR_2$. The outputs of $SRL_{17}$ and $XOR_2$ are connected to the inputs of $XOR_3$.

These connections between SRLs 12 and XOR gates 16 define the polynomial function implemented by SA 14. More specifically, the polynomial function may be described as the function of an independent variable "x." The output of each SRL 12 in SA 14 corresponds to one factor of x. The output of the SRL 12 of SA 14 nearest SCAN IN represents the lowest factor of x, whereas the output of the SRL 12 nearest SCAN OUT represents the highest factor of x. Referring to FIG. 2, the outputs of $SRL_{15}$, $SRL_{16}$, $SRL_{17}$, $SRL_{18}$, $SRL_{19}$, $SRL_{20}$, $SRL_{21}$, $SRL_{22}$, $SRL_{23}$, $SRL_{24}$, $SRL_{25}$, $SRL_{26}$, $SRL_{27}$, and $SRL_{28}$ correspond to factors of $x^1$, $x^2$, $x^3$, $x^4$, $x^5$, $x^6$, $x^7$, $x^8$, $x^9$, $x^{10}$, $x^{11}$, $x^{12}$, $x^{13}$, and $x^{14}$, respectively. Thus, the polynomial function implemented by the connections of SRLs 12 and XOR gates 16 shown in FIG. 2 is:

$$x^{14}+x^5+x^4+x^3+1$$

Generally, the number of XOR gates 16 used and their connections to the outputs of various SRLs 12 in SA 14 are dictated by the specific polynomial function that is implemented. Thus, in other embodiments, the inputs of $XOR_1$, $XOR_2$, and $XOR_3$ may be connected to the outputs of other SRLs 12 of SA 14 instead of, or in addition to, the outputs of $SRL_{17}$, $SRL_{18}$, $SRL_{19}$, and $SRL_{28}$; furthermore, additional XOR gates 16 may be used.

$XOR_4$ and MUX 18 are disposed between the SRLs 12 of scan chain 110 that are contained in SA 14 and the SRLs 12 that are not contained in SA 14. One input of $XOR_4$ is connected to the output of $XOR_3$. The other input of $XOR_4$ is connected to the SRL 12 of scan chain 110 adjacent, but not included in, SA 14. As shown in FIG. 2, this is $SRL_{14}$. The output of $XOR_4$ is connected to one input of MUX 18. The other input of MUX 18 is connected to the output of $SRL_{14}$. A "COMPRESS ON/OFF" signal is applied to the control input of MUX 18. The COMPRESS ON/OFF signal may be generated by control device 20. The output of MUX 18 is connected to the input of $SRL_{15}$. More generally, $SRL_{15}$ is the first SRL 12 of scan chain 110 that is included in SA 14.

FIG. 2 illustrates SA 14 in its preferred embodiment as a serial signature analyzer (SSA). An SSA monitors a single output line of test results data. Alternatively, in another embodiment, SA 14 may be formed as a parallel signature analyzer (PSA), which monitors a plurality of parallel output lines.

Still referring to FIG. 2, control device 20 is connected to SA 14. Control device 20 generates a COMPRESS ON/OFF signal that enables and disables the compression feature of SA 14. Control device 20 may include a memory which stores data related to test patterns, test results, and signatures. The memory allows control device 20 to automatically generate the COMPRESS ON/OFF signal, depending upon the test results. Alternatively, an operator of system 13 may use control device 20 to manually apply the COMPRESS ON/OFF signal.

In a preferred embodiment system 13 is formed on the IC device to be structurally tested. Consequently, system 13 may be a part of a built-in self test (BIST) system to test the IC device. Alternatively, system 13 may be formed separate from the IC device to be tested. For example, system 13 may be formed on a testing device.

System 13 is versatile. In other words, system 13 may be used in conjunction with many existing automatic test pattern generation (ATPG) programs implemented in a variety of testers to structurally test a number of different processing modules. For example, system 13 may be used in conjunction with the FastScan program sold by Mentor Graphics, Inc. Also, system 13 may be used to compress result data output by any of a number of different processing modules, such as a master processor (MP), a parallel processor (PP), a transfer processor (TP), or a frame controller (FC). For example, system 13 may compress the test results output by a Multimedia Video Processor ("MVP") manufactured and sold by Texas Instruments, Inc., Dallas, Tex. Furthermore, the data output or compressed by system 13 may be input into and analyzed by a variety of existing testers, such as the Polaris/MegaOne testing system manufactured by Megatest Corp. or the V-Series tester manufactured and sold by Texas Instruments, Inc.

In operation, system 13 acts either as a signature analyzer or as a part of scan chain 110. More specifically, calculations are performed in advance to determine what test patterns would produce unknown states in the test results. Depending upon the test pattern input into the IC device, system 13 either implements a polynomial function upon the test results, thereby compressing the results, or shifts the results, unaltered, into a tester.

The compression of test results occurs on a pattern by pattern basis. The compression feature of SA 14 is activated by the COMPRESS ON/OFF signal generated by control device 20 and applied to the control input of MUX 18. The COMPRESS ON/OFF signal directs MUX 18 to select either the output of $SRL_{14}$ or the output of $XOR_4$ as the input for $SRL_{15}$.

If, based upon the calculations performed in advance, the test pattern to be input into the IC device would not produce any unknown states in the test results, then control device 20 applies a "COMPRESS ON" signal to the control input of MUX 18 at COMPRESS ON/OFF. This signal causes MUX 18 to select the output of $XOR_4$ as the input for $SRL_{15}$. MUX 18 and XOR gates 16 form part of a feedback loop in SA 14. The output of $XOR_3$ constitutes feedback data. The current term in the feedback data can be calculated as:

$$Bit(SRL_{28}) \text{ XOR } Bit(SRL_{19}) \text{ XOR } Bit(SRL_{18}) \text{ XOR } Bit(SRL_{17})$$

where the terms $Bit(SRL_{28})$, $Bit(SRL_{19})$, $Bit(SRL_{18})$, and $Bit(SRL_{17})$ represent the contents of $SRL_{28}$, $SRL_{19}$, $SRL_{18}$, and $SRL_{17}$, respectively. The feedback data is input into $XOR_4$ simultaneously with the test results. Clock signals are applied at CLK to advance the test results through SA 14. The feedback loop alters or compresses the test results as the results are shifted through $SRL_{15}$, $SRL_{16}$, $SRL_{17}$, $SRL_{18}$, $SRL_{19}$, $SRL_{20}$, $SRL_{21}$, $SRL_{22}$, $SRL_{23}$, $SRL_{24}$, $SRL_{25}$, $SRL_{26}$, $SRL_{27}$, and $SRL_{28}$. After compression, the contents of these SRLs 12 constitute the signature of the test results. The signature is input into a tester. The tester analyzes the signature to determine whether the IC device has functioned properly for the test pattern that was input.

On the other hand, if the test pattern to be input into the IC device would create one or more unknown states in the test results, control device 20 applies a "COMPRESS OFF" signal to the control input of MUX 18 at COMPRESS ON/OFF. This signal causes MUX 18 to select the output of $SRL_{14}$ as the input for $SRL_{15}$. The feedback loop formed partly by XOR gates 16 and MUX 18 does not operate upon the test results as they are shifted through $SRL_{15}$, $SRL_{16}$, $SRL_{17}$, $SRL_{18}$, $SRL_{19}$, $SRL_{20}$, $SRL_{21}$, $SRL_{22}$, $SRL_{23}$, $SRL_{24}$, $SRL_{25}$, $SRL_{26}$, $SRL_{27}$, and $SRL_{28}$. Rather, the results are advanced through these SRLs 12 of SA 14 as if $SRL_{15}$, $SRL_{16}$, $SRL_{17}$, $SRL_{18}$, $SRL_{19}$, $SRL_{20}$, $SRL_{21}$, $SRL_{22}$, $SRL_{23}$, $SRL_{24}$, $SRL_{25}$, $SRL_{26}$, $SRL_{27}$, and $SRL_{28}$ were part of a normal scan chain. Consequently, the results of the test pattern are not compressed. The unaltered test results are fed into the tester, which is capable of analyzing non-compressed data in addition to compressed data. The tester determines whether the IC device has functioned properly based upon the unaltered test results.

For example, referring again to FIG. 2, assume that the 28 SRLs 12 of scan chain 110 contains the following data bits:

11110000XXXX0011111111111111

The last 14 bits (11111111111111) are contained in the 14 SRLs from which SA 14 is structured. The first 14 bits (11110000XXXX00) are contained in the remaining 14 SRLs of scan chain 110. These 28 bits represent the test results for a specified test pattern input into the integrated circuit device. The "X" terms represent unknown states.

Based upon the calculations performed in advance, it is known that the test results contain unknown states. Accordingly, control device 20 applies a "COMPRESS OFF" signal to the control input of MUX 18. MUX 18 selects the output of $SRL_{14}$ as the input for $SRL_{15}$. Because the output of the feedback loop is not selected, the data is shifted through SA 14 unaltered. Consequently, with the application of sequential clock signals, the data bits contained in the 28 SRLs are as follows:

```
-11110000XXXX001111111111111
--11110000XXXX00111111111111
---11110000XXXX0011111111111
----11110000XXXX001111111111
-----11110000XXXX00111111111
------11110000XXXX0011111111
-------11110000XXXX001111111
--------11110000XXXX00111111
---------11110000XXXX0011111
```

Thus, the test results are not changed as they are shifted through SA 14. Accordingly, system 13 can selectively compress test results output by an IC device, thereby allowing system 13 to be used even if some of the test results contain unknown states.

Figure 3:
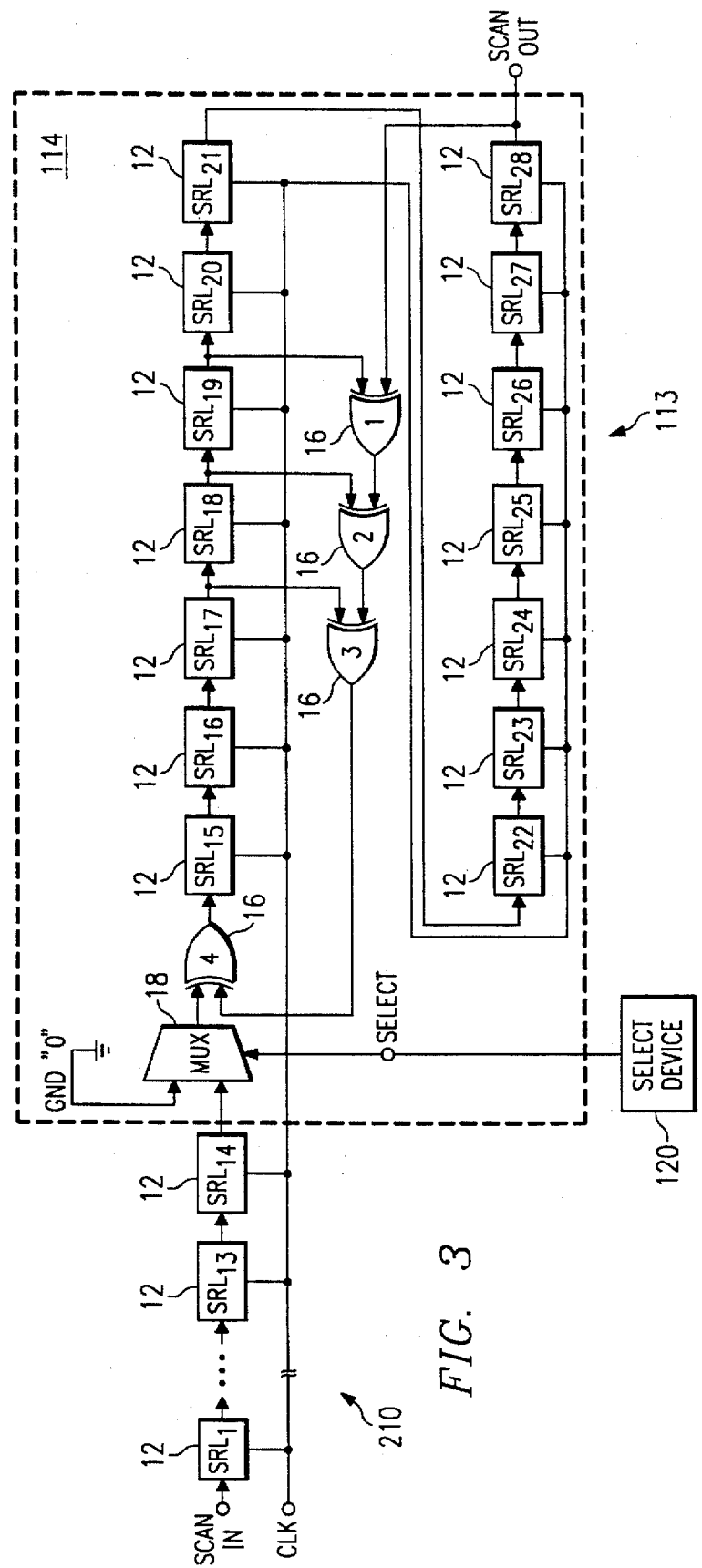
FIG. 3 is a block diagram depicting a system for structurally testing an IC device according to a second embodiment of the present invention.

FIG. 3 illustrates a system 113 for structurally testing an IC device in accordance with a second embodiment of the present invention. System 113 includes a signature analyzer (SA) 114, which may be formed using a number of SRLs 12 contained in a scan chain 210, and a select device 120.

System 113 is operable to replace certain bits in the test results output by the IC device. More particularly, system 113 replaces each bit in the test results having an unknown state with a bit having a known state. Consequently, the modified test results can be compressed.

The structure and elements of system 113 are virtually identical to the structure and elements of system 13 described with reference to FIG. 2, except for the features that allow system 113 to replace bits having an unknown state. Therefore, the following description for system 113 focuses primarily upon those features of system 113 that are not included in system 13.

Referring to FIG. 3, MUX 18 and $XOR_4$ are disposed between the SRLs 12 of scan chain 210 that are contained in SA 114 and the SRLs 12 that are not contained in SA 114. One input of MUX 18 is connected to ground or "0." The other input of MUX 18 is connected to $SRL_{14}$, which generally is the SRL 12 of scan chain 210 adjacent, but not included in, SA 114. A "SELECT" signal is applied to the control input of MUX 18. The "SELECT" signal is generated by select device 20. The output of MUX 18 is connected to one input of $XOR_4$. The other input of $XOR_4$ is connected to the output of $XOR_3$. The output of $XOR_4$ is connected to the input of $SRL_{15}$. More generally, $SRL_{15}$ is the first SRL 12 of scan chain 210 that is included in SA 114.

In operation, system 113 replaces each bit in the test results having an unknown state with a bit having a known state. More specifically, calculations are performed in advance to determine what test patterns would produce unknown states in the test results, and also where the unknown states would appear in those test results. If a test pattern input into the IC device would produce an unknown state in the test results, system 113 enters a known state in place of the unknown state. System 113 implements a polynomial function upon the modified test results, thereby compressing the results. Consequently, all test results will be compressed by system 113.

The replacement of bits in the test results occurs on a bit by bit basis. The replacement feature of system 113 is activated by the SELECT signal generated by select device 120 and applied to the control input of MUX 18. The SELECT signal directs MUX 18 to select either the output of $SRL_{14}$ or ground as an input for $XOR_4$.

If, based upon the calculations performed in advance, a bit in the test results has a known state, then select device 120 applies a first signal to the control input of MUX 18 at SELECT. This first signal causes MUX 18 to select the output of $SRL_{14}$ as one input for $XOR_4$.

On the other hand, if the bit in the test results has an unknown state, select device 120 applies a second signal to the control input of MUX 18. The second signal directs MUX 18 to select ground as an input for $XOR_4$. The selection of ground causes a "0" value to be entered in place of the unknown state. Alternatively, a "1" value may be entered in place of the unknown state if this input of MUX 18 is connected to a voltage source (not shown). The output of MUX 18 is input into $XOR_4$.

The XOR gates 16 form part of a feedback loop in SA 114. The data appearing at the output for $XOR_3$ constitutes feedback data. The feedback data is input into $XOR_4$ simultaneously with output of MUX 18.

Clock signals are applied at CLK to advance the test results through SA 114. The test results are compressed by the operation of the feedback loop as the results are shifted through $SRL_{15}$, $SRL_{16}$, $SRL_{17}$, $SRL_{18}$, $SRL_{19}$, $SRL_{20}$, $SRL_{21}$, $SRL_{22}$, $SRL_{23}$, $SRL_{24}$, $SRL_{25}$, $SRL_{26}$, $SRL_{27}$, and $SRL_{28}$. After compression, the contents of these SRLs 12 constitute the signature of the test results. The signature is input into a tester. The tester analyzes the signature to determine whether the IC device has functioned properly for the test pattern that was input.

For example, still referring to FIG. 3, assume again that the 28 SRLs 12 of scan chain 210 contain the following data bits:

```
11110000XXXX001111111111111
```

The last 14 bits (11111111111111) are contained in the 14 SRLs from which SA 114 is structured. The first 14 bits (11110000XXXX00) are contained in the remaining SRLs 12 of scan chain 210. Based upon the calculations performed in advance, it is known that bits having unknown states appear at the locations designated by "X" in the scan chain.

Initially, a bit having a "0" value appears at the output of $SRL_{14}$. Select device 120 applies the first signal to the control input of MUX 18 causing MUX 18 to select the output of $SRL_{14}$, rather than ground. Thus, MUX 18 outputs a "0" value to one input of $XOR_4$.

The other input of $XOR_4$ is connected to the feedback loop. The current term in the feedback data can be calculated as:

$$Bit(SRL_{28}) \text{ XOR } Bit(SRL_{19}) \text{ XOR } Bit(SRL_{18}) \text{ XOR } Bit(SRL_{17})$$

Thus, the initial feedback term is "0" because:

$$1 \text{ XOR } 1 \text{ XOR } 1 \text{ XOR } = 0$$

The initial feedback term of "0" is input into $XOR_4$ simultaneously with the "0" value output by MUX 18. In response $XOR_4$ outputs a "0" because:

$$0 \text{ XOR } 0 = 0$$

Consequently, after the first clock signal is applied, the data bits contained in the 28 SRLs of scan chain 210 are as follows:

```
-11110000XXXX001111111111111
```

For similar reasons, after the second clock signal is applied, the data bits contained in the 28 SRLS are:

-11110000XXXX00111111111111

At this point, the bit appearing at the output of $SRL_{14}$ has an "X" value designating an unknown state. Select device 120 applies the second clock signal to the control input of MUX 18, causing MUX 18 to select ground. Consequently, MUX 18 outputs a "0" value. After a third clock signal, the data bits in scan chain 210 are:

--11110000XXX00011111111111

The next three bits appearing at the output of $SRL_{14}$ have an "X" value. Accordingly, during each of the next three clock signals, select device 120 applies the second clock signal to the control input of MUX 18, which outputs a "0" value in response. Thus, with the application of sequential clock signals, the data bits contained in the 28 SRLs 12 are as follows:

```
----11110000XX10001111111111
-----11110000X01000111111111
------111100001010001111111 1
-------11110000101000111111 1
--------1111000010100011111 1
---------111101001010001111 1
----------11110100101000111 1
-----------1111010010100011 1
------------111101001010001 1
-------------11110100101000 11
--------------1101010010100 01
---------------1101010010100 0
```

The last line shown above is the 14-bit signature output by system 113 for the original 28-bit test results. The signature can be input into a tester to verify the operation of the IC device which output the test results. Accordingly, system 113 compresses all test results output by an IC device, thereby allowing system 13 to be used even if some of the test results contain unknown states.

Figure 4:
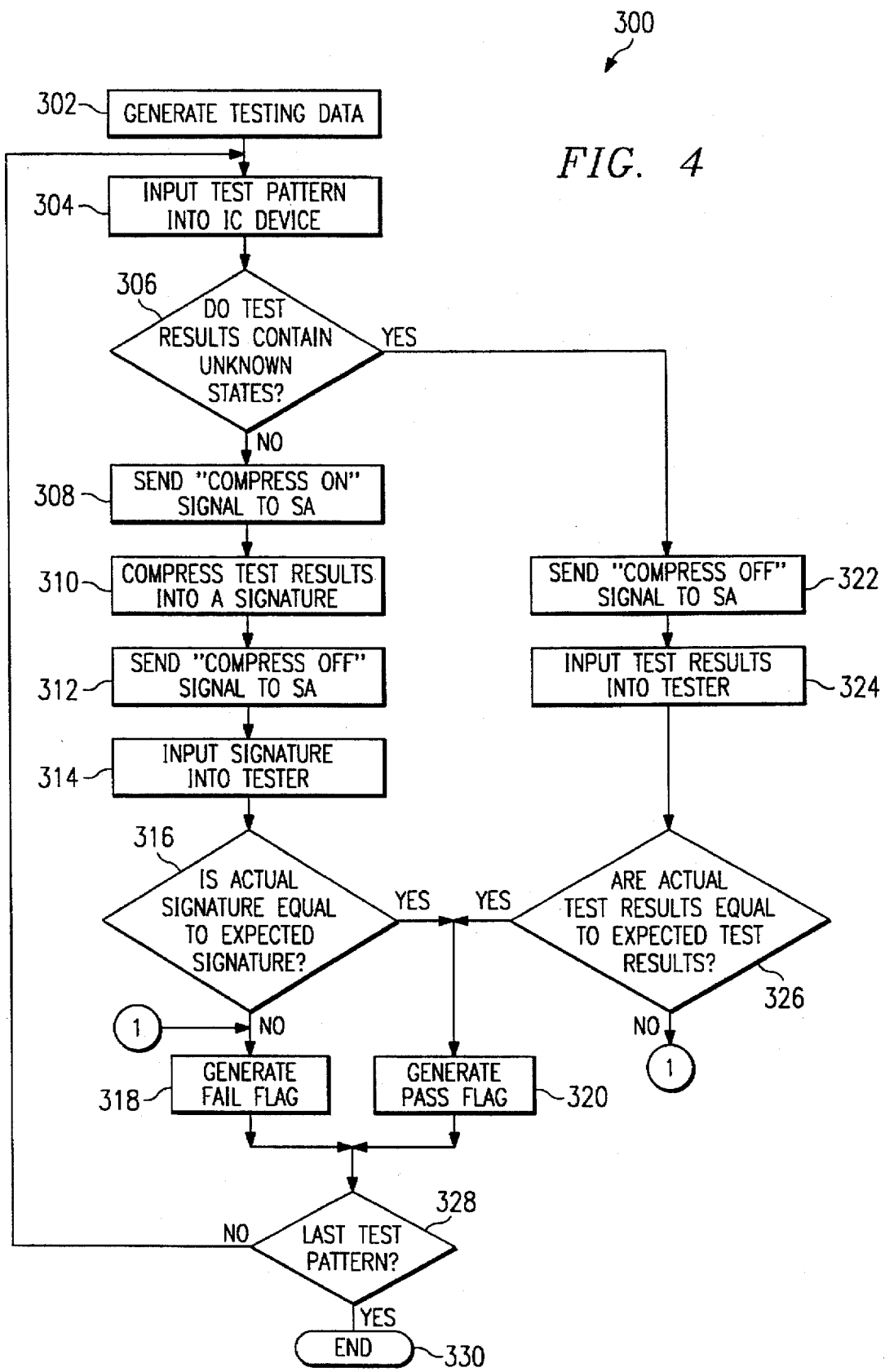
FIG. 4 is a flow diagram that illustrates a method for structurally testing a semiconductor IC device, in accordance with an embodiment of the present invention.

FIG. 4 is a flow diagram that illustrates a method for structurally testing a semiconductor IC device, in accordance with the first embodiment of the present invention. Referring to FIGS. 2 and 4, a testing process 300 begins at step 302. Testing data for structurally testing an IC device is generated by a simulator. The testing data includes pseudo-random and/or deterministic test patterns and their corresponding calculated responses. Each test pattern is designed to structurally test a specific aspect of the IC device. The testing data also identifies which pseudo random test patterns would produce unknown states in the corresponding test results, based upon the calculated responses. For test patterns in which no unknown states would appear in the test results, the testing data also includes corresponding signatures. Portions of the testing data may be stored in a memory on the IC device, a testing system, or with SA 14. More particularly, if a test pattern would produce unknown states in the test results, that pattern and its corresponding test results are stored in the memory. If a test pattern would not produce unknown states, that test pattern and its corresponding signature are stored in the memory. Because signatures are substantially smaller than uncompressed test results, the amount of memory required under testing process 300 is reduced.

At step 304, one of the pseudo random test patterns generated in step 302 is input into an IC device to be tested. The IC device operates upon the input test pattern and produces test results.

At step 306, a determination is made whether the test pattern that was input into the IC device would create unknown states in the test results. If the test pattern would not cause unknown states to appear in the test results, testing process 300 moves to step 308. Control device 20 applies a "COMPRESS ON" signal to the control input of MUX 18 in SA 14 in order to enable the feedback loop partly formed from MUX 18 and the XOR gates 16, thereby turning on the compression function. At step 310, the test results are compressed into a signature by SA 14. The control device 20 applies a "COMPRESS OFF" signal to the control input of MUX 18 in order to turn off the compression function, at step 312.

At step 314, the signature is input into a tester. The tester includes a memory containing the pseudo random test patterns that may be input into the IC device and their corresponding signatures or test results. At step 316, the tester determines whether the actual signature is equal to the expected calculated signature.

If the actual signature is not the same as the expected signature, at step 318 the tester generates a fail flag indicating that the IC device failed to function properly for that test. Testing process 300 moves to step 328.

If the actual signature is equal to the expected signature, at step 320 the tester generates a pass flag indicating that the IC device functions properly for the given test. Testing process 300 then moves to step 328.

On the other hand, if at step 306 it is determined that the test pattern input into the IC device would create unknown states in the test results, testing process 300 proceeds to step 322. In this case, control device 20 applies a "COMPRESS OFF" signal to the control input of MUX 18 in SA 14 in order to disable the feedback loop, or turn off the compression function. Because the feedback loop has been disabled, the test results are not altered. At step 324, the test results are input into the tester.

At Step 326, the tester determines whether the actual test results are the same as the calculated response.

If the actual test results and the calculated response are the same, the tester generates a pass flag indicating that the IC device functions properly for the given test pattern at step 320. Testing process 300 then moves to step 328.

If the actual results and the calculated response are not the same, at step 318 the tester generates a fail flag indicating that the IC device does not function properly for the given test pattern. Testing process 300 moves to step 328.

At step 328, a determination is made whether the test pattern that was most recently input into the IC device is the last test pattern. If the test pattern is not the last test pattern, process 300 returns to step 304, where another test pattern is input into the IC device.

If the test pattern is the last test pattern, process 300 is ended at step 330.

Accordingly, the present invention provides a system and method that can be used to selectively compress the test results output by an IC device. In this manner, the system and method can be used even when unknown states appear in some of the test results. Consequently, the system and method greatly reduce the Mount of memory and circuitry necessary to structurally test an IC device.

Although the present invention and its advantages have been described in detail, it should be understood that various changes, substitutions and alterations can be made herein without departing from the spirit and scope of the invention as defined by the appended claims.

What is claimed is:

1. A system for structurally testing an integrated circuit device, comprising:
    a signature analyzer operable to compress test results received from the integrated circuit device into a signature; and a control device coupled to the signature analyzer and operable to enable the compression operation of the signature analyzer when the test results contain known states and disable the compression operation when the test results contain unknown states.

2. The system of claim 1, wherein the signature analyzer is structured from a portion of a scan chain.

3. The system of claim 1, wherein the signature analyzer is formed from a plurality of shift register latches.

4. The system of claim 1, further comprising a tester connected to the signature analyzer, the tester operable to determine whether the integrated circuit device is functioning properly based upon either the test results or the signature.

5. The system of claim 1, wherein the system is implemented on the integrated circuit device that is tested.

6. The system of claim 1, wherein the control device comprises a memory circuit operable to store data relating to test patterns and test results.

7. The system of claim 1, wherein the signature analyzer comprises a multiplexer operable to input either test results or feedback data into a plurality of shift register latches.

8. A system for structurally testing an integrated circuit device, comprising:

a signature analyzer operable to compress test results received from the integrated circuit device into a signature; and a select device coupled to the signature analyzer and operable to select a bit having a known state to be entered into the signature analyzer in place of each bit in the test results having an unknown state.

9. The system of claim 8, wherein the signature analyzer is a serial signature analyzer.

10. The system of claim 8, wherein the system is implemented on the integrated circuit device as a built-in self test (BIST) system.

11. The system of claim 8, wherein the system is implemented separate from the integrated circuit device.

12. The system of claim 8, wherein the signature analyzer is operable to perform a polynomial function on the test results to compress the test results.

13. The system of claim 8, wherein the signature analyzer comprises a multiplexer.

14. A method for structurally testing an integrated circuit device, comprising the steps of:

generating testing data to be used in testing the device, the testing data comprising a sequence of test patterns and corresponding test results having a plurality of bits;

determining which test results contain any unknown states;

inputting a test pattern into the integrated circuit device to generate test results;

compressing the test results into a signature and analyzing the signature to determine if the integrated circuit device is functioning properly if the test results do not contain unknown states; and analyzing the test results to determine if the integrated circuit device is functioning properly if the test results do contain unknown states.

15. The method of claim 14, further comprising the step of identifying which bits in the test results are unknown states.

16. The method of claim 14, further comprising the step of generating a pass flag when the integrated circuit device is functioning properly and a fail flag when the integrated circuit device is not functioning properly.

17. The method of claim 14, wherein the step of generating testing data comprises generating corresponding signatures for test results which do not contain unknown states.

18. The method of claim 14, wherein the step of compressing the test results comprises implementing a polynomial function upon the test results.

19. The method of claim 14, further comprising the step of generating a control signal to enable and disable the compression of test results data.

20. The method of claim 14, wherein the step of determining whether the integrated circuit device is functioning properly if the test results do not contain any unknown states is accomplished by signature analysis.

* * * * *